United States Patent
Takami et al.

(10) Patent No.: US 7,582,386 B2
(45) Date of Patent: Sep. 1, 2009

(54) NONAQUEOUS ELECTROLYTE BATTERY, BATTERY PACK AND VEHICLE

(75) Inventors: Norio Takami, Yokohama (JP); Hiroki Inagaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 338 days.

(21) Appl. No.: 11/230,482

(22) Filed: Sep. 21, 2005

(65) Prior Publication Data

US 2007/0009797 A1    Jan. 11, 2007

(30) Foreign Application Priority Data

Jul. 7, 2005    (JP)    ............................. 2005-198871

(51) Int. Cl.
  H01M 4/58    (2006.01)
  H01M 4/00    (2006.01)
  H01M 4/50    (2006.01)
  H01M 4/52    (2006.01)
  H01M 4/66    (2006.01)

(52) U.S. Cl. .................... 429/231.1; 429/221; 429/223; 429/224; 429/231.2; 429/231.3; 429/231.5; 429/218.1; 429/245

(58) Field of Classification Search .............. 429/231.9, 429/94, 209, 217, 231.1, 231.95, 322, 213, 429/218, 221–224, 231.2, 231.3, 231.5, 245; 420/535, 552; 324/158.1
See application file for complete search history.

(56) References Cited

U.S. PATENT DOCUMENTS

| 4,559,284 | A | * | 12/1985 | Nishimura et al. | .......... 429/213 |
| 6,524,749 | B1 | * | 2/2003 | Kaneda et al. | ......... 429/231.95 |
| 6,573,704 | B2 | * | 6/2003 | Mirov | ..................... 324/158.1 |
| 6,824,923 | B2 | * | 11/2004 | Che et al. | ................ 429/231.1 |
| 2002/0006548 | A1 | * | 1/2002 | Tsutsue et al. | .............. 429/217 |
| 2003/0059336 | A1 | * | 3/2003 | Aida et al. | ................... 420/535 |
| 2003/0180618 | A1 | * | 9/2003 | Inoue et al. | .............. 429/231.1 |
| 2004/0096745 | A1 | * | 5/2004 | Shibano et al. | ............. 429/322 |
| 2005/0064282 | A1 | | 3/2005 | Inagaki et al. | |
| 2005/0069777 | A1 | | 3/2005 | Takami et al. | |

(Continued)

FOREIGN PATENT DOCUMENTS

JP    2004-221523    8/2004

(Continued)

OTHER PUBLICATIONS

U.S. Appl. No. 11/387,776, filed Mar. 24, 2006, Inagaki, et al.

(Continued)

*Primary Examiner*—Alexa D Neckel
*Assistant Examiner*—Claire L Rademaker
(74) *Attorney, Agent, or Firm*—Oblon, Spivak, McClelland, Maier & Neustadt, P.C.

(57) ABSTRACT

A nonaqueous electrolyte battery includes a positive electrode and a negative electrode. The positive electrode comprises a positive electrode layer containing a metal compound. The metal compound contains lithium and at least one kind of metal selected from the group consisting of cobalt, nickel, manganese, iron and vanadium. The negative electrode comprises a negative electrode layer containing a negative electrode active material having a Li ion insertion potential not lower than 0.4 V (vs. Li/Li$^+$). The positive electrode layer and the negative electrode layer satisfy formulas (1) to (3) given below:

$0.5 \text{m}^2/\text{g} \leq S_n \leq 50 \text{m}^2/\text{g}$    (1)

$5 \leq (S_n/S_p) \leq 100$    (2)

$0.5 \leq (L_p/L_n) < 1$    (3).

24 Claims, 4 Drawing Sheets

U.S. PATENT DOCUMENTS

| | | |
|---|---|---|
| 2005/0079409 A1* | 4/2005 | Andelman et al. ............. 429/94 |
| 2005/0221173 A1 | 10/2005 | Tatebayashi et al. |
| 2005/0221187 A1 | 10/2005 | Inagaki et al. |
| 2005/0221188 A1 | 10/2005 | Takami et al. |
| 2006/0127769 A1* | 6/2006 | Fujimoto et al. ......... 429/231.1 |
| 2006/0134520 A1 | 6/2006 | Ishii et al. |
| 2007/0048607 A1* | 3/2007 | Nakashima et al. ......... 429/209 |
| 2008/0070115 A1 | 3/2008 | Saruwatari et al. |

FOREIGN PATENT DOCUMENTS

| | | | |
|---|---|---|---|
| WO | WO 2004/066422 | * | 5/2004 |
| WO | WO 2005057690 | * | 6/2005 |

OTHER PUBLICATIONS

U.S. Appl. No. 11/470,482, filed Sep. 6, 2006, Takami, et al..
U.S. Appl. No. 11/531,142, filed Sep. 12, 2006, Morishima, et al.
U.S. Appl. No. 11/756,259, filed May 31, 2007, Saruwatari, et al.
U.S. Appl. No. 11/230,635, filed Sep. 21, 2005, Takami, et al.
U.S. Appl. No. 11/228,430, filed Sep. 19, 2005, Inagaki, et al.
U.S. Appl. No. 11/148,169, filed Jun. 9, 2005, Inagaki, et al.
U.S. Appl. No. 11/260,410, filed Oct. 28, 2005, Inagaki, et al.
U.S. Appl. No. 11/260,435, filed Oct. 28, 2005, Takami, et al.
U.S. Appl. No. 11/261,538, filed Oct. 31, 2005, Inagaki, et al.
U.S. Appl. No. 11/257,040, filed Oct. 25, 2005, Inagaki, et al.

* cited by examiner

NONAQUEOUS ELECTROLYTE BATTERY, BATTERY PACK AND VEHICLE

CROSS-REFERENCE TO RELATED APPLICATIONS

This application is based upon and claims the benefit of priority from prior Japanese Patent Application No. 2005-198871, filed Jul. 7, 2005, the entire contents of which are incorporated herein by reference.

BACKGROUND OF THE INVENTION

1. Field of the Invention

The present invention relates to a nonaqueous electrolyte battery, a battery pack comprising the nonaqueous electrolyte batteries, and a vehicle having the battery pack mounted thereto.

2. Description of the Related Art

A nonaqueous electrolyte battery comprising a negative electrode containing a lithium metal, a lithium alloy, a lithium compound or a carbonaceous material attracts attentions as a battery having a high energy density, and a vigorous research is being conducted on the particular nonaqueous electrolyte battery. A lithium ion battery comprising a positive electrode containing $LiCoO_2$ or $LiMn_2O_4$ as an active material and a negative electrode containing a carbonaceous material capable of absorbing-releasing lithium has been widely put to the practical use. Also, it is studied to use a metal oxide or an alloy in place of the carbonaceous material in the negative electrode. Where such a nonaqueous electrolyte battery is mounted to a vehicle such as an automobile, the nonaqueous electrolyte battery is required to exhibit a high performance even in the cold region and, thus, is required to exhibit a high output performance and a long cycle life performance under a low temperature environment of −20° C. or lower.

Disclosed in Japanese Patent Disclosure (Kokai) No. 2004-221523 is an electrochemical capacitor. It is taught that a lithium-titanium oxide having a ramsdellite crystal structure is used in the negative electrode of the electrochemical capacitor, and that the ratio of the electric capacity of the negative electrode to that of the positive electrode, i.e., negative electrode electric capacity/positive electrode electric capacity, is 1 to 7 in the electrochemical capacitor.

BRIEF SUMMARY OF THE INVENTION

An object of the present invention is to provide a nonaqueous electrolyte battery excellent in the charge-discharge cycle characteristics under low temperatures not higher than −20° C., a battery pack using the nonaqueous electrolyte battery, and a vehicle using the battery pack.

According to a first aspect of the present invention, there is provided a nonaqueous electrolyte battery comprising:

a positive electrode comprising a positive electrode layer containing a metal compound, the metal compound containing lithium and at least one kind of metal selected from the group consisting of cobalt, nickel, manganese, iron and vanadium;

a negative electrode comprising a negative electrode layer containing a negative electrode active material having a Li ion insertion potential not lower than 0.4 V (vs. Li/Li$^+$); and a nonaqueous electrolyte;

wherein the positive electrode layer and the negative electrode layer satisfy formulas (1) to (3) given below:

$$0.5 m^2/g \leq S_n \leq 50 m^2/g \quad (1)$$

$$5 \leq (S_n/S_p) \leq 100 \quad (2)$$

$$0.5 \leq (L_p/L_n) < 1 \quad (3)$$

where $S_n$ denotes a specific surface area (m$^2$/g) of the negative electrode layer as determined by the BET method, $S_p$ denotes a specific surface area (m$^2$/g) of the positive electrode layer as determined by the BET method, $L_n$ denotes a thickness (μm) of the negative electrode layer, and $L_p$ denotes a thickness (μm) of the positive electrode layer.

According to a second aspect of the present invention, there is provided a battery pack comprising nonaqueous electrolyte batteries, each of the nonaqueous electrolyte batteries comprising:

a positive electrode comprising a positive electrode layer containing a metal compound, the metal compound containing lithium and at least one kind of metal selected from the group consisting of cobalt, nickel, manganese, iron and vanadium;

a negative electrode comprising a negative electrode layer containing a negative electrode active material having a Li ion insertion potential not lower than 0.4 V (vs. Li/Li$^+$); and a nonaqueous electrolyte;

wherein the positive electrode layer and the negative electrode layer satisfy formulas (1) to (3) given above.

Further, according to a third aspect of the present invention, there is provided a vehicle comprising a battery pack comprising nonaqueous electrolyte batteries, each of the nonaqueous electrolyte batteries comprising:

a positive electrode comprising a positive electrode layer containing a metal compound, the metal compound containing lithium and at least one kind of metal selected from the group consisting of cobalt, nickel, manganese, iron and vanadium;

a negative electrode comprising a negative electrode layer containing a negative electrode active material having a Li ion insertion potential not lower than 0.4 V (vs. Li/Li$^+$); and a nonaqueous electrolyte;

wherein the positive electrode layer and the negative electrode layer satisfy formulas (1) to (3) given above.

DETAILED DESCRIPTION OF THE INVENTION

Figure 1:
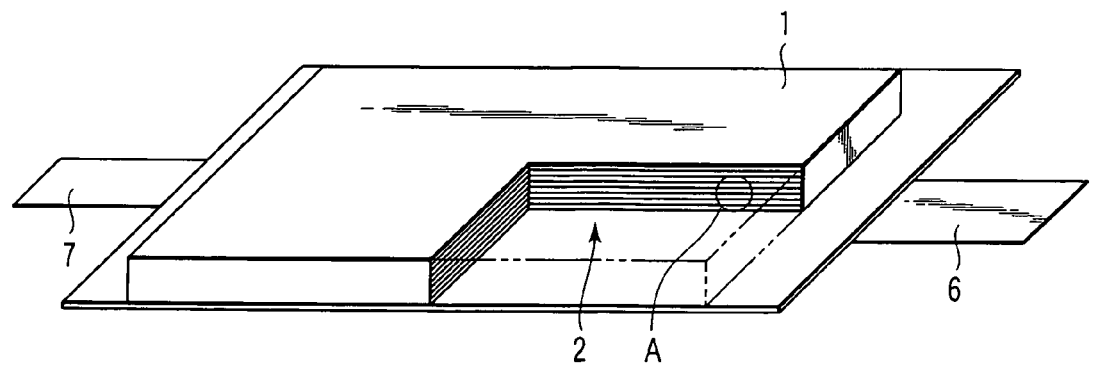
FIG. 1 is an oblique view, partly broken away, schematically showing the construction of a flattened type nonaqueous electrolyte battery according to one embodiment of the present invention.

The present inventors have conducted an extensive research in an attempt to improve the charge-discharge cycle characteristics of a nonaqueous electrolyte battery under a low temperature environment not higher than −20° C. As a result, the present inventors have found that it is possible to suppress the lithium deposition on the surface of the negative electrode and to suppress the decomposition by reduction of the solvent even in the case of the rapid charge (high input) of the nonaqueous electrolyte battery under a low temperature environment not higher than −20° C. under the conditions given below. Specifically, in order to obtain the effects pointed out above, it has been found necessary to satisfy the conditions that the negative electrode active material should exhibit the Li ion insertion potential not lower than 0.4 V (vs. Li/Li$^+$), that the negative electrode layer should have a specific surface area $S_n$ falling within a range of 0.5 to 50 m$^2$/g, and that the nonaqueous electrolyte battery should have a ratio of the specific surface area ($S_n$) of the negative electrode layer to the specific surface area ($S_p$) of the positive electrode layer, i.e., a ratio $S_n/S_p$, falling within a range of 5 to 100.

To be more specific, it has been found that, even if the nonaqueous electrolyte battery comprises a negative electrode layer containing a negative electrode active material exhibiting a Li ion insertion potential not lower than 0.4 V (vs. Li/Li$^+$), it is impossible to obtain a sufficient effect of suppressing the lithium deposition if the specific surface area $S_n$ of the negative electrode layer is smaller than 0.5 m$^2$/g, or if the ratio ($S_n/S_p$) is smaller than 5. Also, if the specific surface area $S_n$ of the negative electrode layer is larger than 50 m$^2$/g, or if the ratio ($S_n/S_p$) exceeds 100, the nonaqueous electrolyte is held excessively in the negative electrode so as to bring about deficiency of the nonaqueous electrolyte on the positive electrode, with the result that the positive electrode is over-discharged when the nonaqueous electrolyte battery is discharged with a high output under a low temperature environment. It is desirable for the specific surface area $S_n$ of the negative electrode layer to fall within a range of 5 to 50 m$^2$/g. On the other hand, the desirable ratio ($S_n/S_p$) falls within a range of 10 to 80.

Further, according to the embodiment of the present invention, it is possible to permit a highly viscous nonaqueous electrolyte having a lithium salt dissolved therein in a concentration not lower than 1.5 mol/L to permeate uniformly into the positive electrode. As a result, it is possible to make the impedance of the positive electrode smaller than that of the negative electrode under a low temperature environment, with the result that it is possible to suppress the over-discharge of the positive electrode even under a high output with an environment of a low temperature.

It is undesirable for the thickness ratio ($L_p/L_n$) noted above to be smaller than 0.5 because the battery capacity is diminished to lower markedly the energy density. On the other hand, if the thickness ratio ($L_p/L_n$) is not smaller than 1, the ionic resistance and the electronic resistance of the nonaqueous electrolyte within the positive electrode layer are increased, compared with those within the negative electrode so as to lower markedly the output performance and the cycle life of the nonaqueous electrolyte battery under low temperatures. It is more desirable for the thickness ratio ($L_p/L_n$) to fall within a range of 0.6 to 0.9.

It follows that, if it is possible to suppress the lithium deposition on the surface of the negative electrode in the rapid charging stage, to suppress the decomposition by reduction of the nonaqueous electrolyte in the rapid charging stage, and to suppress the over-charging of the positive electrode in the stage of the high output, it is possible to improve the high output performance and the cycle life performance of the nonaqueous electrolyte battery under a low temperature environment not higher than −20° C.

Incidentally, if the specific surface area of the negative electrode layer, the specific surface area ratio ($S_n/S_p$) and the thickness ratio ($L_p/L_n$) are set to fall within the ranges noted above in the case of using a negative electrode active material exhibiting a lithium ion insertion potential lower than 0.4 V (vs. Li/Li$^+$), it is certainly possible to make the impedance of the positive electrode lower than that of the negative electrode. However, the impedance of the negative electrode is markedly increased by the reduction-decomposition reaction of the nonaqueous electrolyte. As a result, a lithium dendrite is deposited on the surface of the negative electrode when the nonaqueous electrolyte battery is rapidly charged (high input) under a low temperature environment so as to impair the high output performance and the charge-discharge cycle characteristics of the nonaqueous electrolyte battery under a low temperature.

The Li ion insertion potential of the negative electrode active material, which denotes the potential at which lithium ions are absorbed by the negative electrode active material, can be measured by the method described herein later. Incidentally, it is desirable for the lithium ion insertion potential of the negative electrode active material to be not lower than 0.4 V (vs. Li/Li$^+$). Also, in order to obtain a higher voltage, it is desirable for the upper limit of the lithium ion insertion potential noted above to be set at 3 V (vs. Li/Li$^+$), more desirably to be set at 2 V (vs. Li/Li$^+$).

In the nonaqueous electrolyte battery according to the embodiment of the present invention, the charge-discharge cycle characteristics under a low temperature can be further improved by setting the specific surface area $S_p$ of the positive electrode layer as determined by the BET method to fall within a range of 0.1 m$^2$/g to 2 m$^2$/g.

The discharge capacity of the nonaqueous electrolyte battery under a low temperature can be improved by using an oxide represented by $Li_aNi_bCo_cMn_dO_2$ (where the molar ratios a, b, c and d are: $0 \leq a \leq 1.1$; b+c+d=1) as a metal compound contained in the positive electrode and by setting the thickness ratio ($L_p/L_n$) to fall within a range of 0.7 to 0.9.

On the other hand, if a titanium-containing metal composite oxide is used as the negative electrode active material, it is possible to decrease the change in volume of the negative electrode accompanying the charge-discharge cycle of the nonaqueous electrolyte battery and, at the same time, it is possible to suppress the reduction and decomposition of the nonaqueous electrolyte. It follows that it is possible to further improve the high output performance and the charge-discharge cycle characteristics of the nonaqueous electrolyte battery under an environment of low temperatures. Among the titanium-containing metal composite oxides, it is desirable to use a lithium-titanium oxide represented by $Li_{4+x}Ti_5O_{12}$ ($-1 \leq x \leq 3$) because it is possible to obtain a high capacity.

Also, it is desirable to use a mixed solvent containing at least two solvents selected from the group consisting of propylene carbonate, ethylene carbonate, diethyl carbonate and γ-butyrolactone for preparing the liquid nonaqueous electrolyte. In the case of using the mixed solvent noted above, it is possible to permit the positive electrode to be impregnated efficiently with the liquid nonaqueous electrolyte so as to further suppress the over-charging of the positive electrode, with the result that the high output performance of the nonaqueous electrolyte battery under a low temperature environment can be further improved.

The negative electrode, the positive electrode and the nonaqueous electrolyte will now be described in detail.

1) Negative Electrode

The negative electrode comprises a negative electrode current collector and a negative electrode layer supported by one surface or both surfaces of the current collector. The negative electrode layer contains an active material, a conductive agent and a binder.

It is desirable for the negative electrode active material to be formed of at least one of a metal oxide, a metal sulfide, a metal nitride and an alloy. Each of the metal oxide, the metal sulfide, the metal nitride and the alloy is capable of absorbing lithium and has a lithium ion insertion potential falling within a range of 0.4 to 3 V (vs. Li/Li$^+$).

The metal oxide that can be used as the negative electrode active material includes, for example, a titanium-containing metal composite oxide, an amorphous tin oxide such as $SnB_{0.4}P_{0.6}O_{3.1}$, a tin silicon oxide such as $SnSiO_3$, silicon oxide such as SiO, and tungsten oxide such as $WO_3$. Particularly, it is desirable to use titanium-containing metal composite oxide as the negative electrode active material.

The titanium-containing metal composite oxide noted above includes, for example, lithium-titanium oxide and a titanium-based oxide that does not contain lithium in the synthesizing stage of the oxide. The lithium-titanium oxide noted above includes, for example, $Li_{4+x}Ti_5O_{12}$ ($-1 \leq x \leq 3$) and $Li_{2+x}Ti_3O_7$ ($-1 \leq x \leq 3$). The titanium-based oxide noted above includes, for example, $TiO_2$ and a metal composite oxide containing Ti and at least one element selected from the group consisting of P, V, Sn, Cu, Ni and Fe. It is desirable for $TiO_2$ to be of anatase type and to have a low crystallinity caused by a heat treating temperature of 300 to 500° C. The metal composite oxide containing Ti and at least one element selected from the group consisting of P, V, Sn, Cu, Ni and Fe includes, for example, $TiO_2$—$P_2O_5$, $TiO_2$—$V_2O_5$, $TiO_2$—$P_2O_5$—$SnO_2$, and $TiO_2$—$P_2O_5$-MeO (Me denoting at least one element selected from the group consisting of Cu, Ni and Fe). To be more specific, it is desirable for the micro structure of the metal composite oxide to include a crystal phase and an amorphous phase or a single phase formed of an amorphous phase. The particular micro structure makes it possible to improve markedly the charge-discharge cycle performance of the nonaqueous electrolyte battery. Particularly, it is desirable to use lithium-titanium oxide and a metal composite oxide containing Ti and at least one element selected from the group consisting of P, V, Sn, Cu, Ni and Fe.

The metal sulfides used as the negative electrode active material include, for example, titanium sulfide such as $TiS_2$, molybdenum sulfide such as $MoS_2$, and iron sulfides such as FeS, $FeS_2$, and $Li_xFeS_2$.

The metal nitride used as the negative electrode active material includes, for example, lithium-cobalt nitride such as $Li_xCo_yN$ ($0 < x < 4, 0 < y < 0.5$).

It is desirable for the negative electrode active material to have an average particle diameter not larger than 1 μm. If the specific surface area $S_n$ of the negative electrode is enlarged by using the negative electrode active material having an average particle diameter exceeding 1 μm, with the result that the negative electrode tends to be rendered low in its capability of being impregnated with the nonaqueous electrolyte so as to markedly larger the impedance of the negative electrode, compared with the positive electrode. It should be noted, however, that, if the average particle diameter of the negative electrode active material is excessively small, the particles of the negative electrode active material tend to be agglomerated so as to lower the homogeneity of the negative electrode. Such being the situation, it is desirable for the lower limit in the average particle diameter of the negative electrode active material to be set at 0.001 μm.

It is desirable for the negative electrode active material to have an average particle diameter not larger than 1 μm and to have a specific surface area of 3 to 200 m$^2$/g as determined by the BET method by utilizing the N$_2$ adsorption. Where these requirements are satisfied, the affinity of the negative electrode with the nonaqueous electrolyte can be further enhanced.

It is desirable for the porosity of the negative electrode excluding the current collector to fall within a range of 20 to 50%. Where this requirement is satisfied, it is possible to obtain a negative electrode excellent in its affinity with the nonaqueous electrolyte and having a high density. It is more desirable for the negative electrode excluding the current collector to have a porosity falling within a range of 25 to 40%.

It is desirable for the negative electrode layer to have a thickness $L_n$ falling within a range of 5 μm to 150 μm on one surface of the current collector, more desirably, falling within a range of 30 μm to 150 μm.

It is desirable for the current collector of the negative electrode to be formed of aluminum foil or aluminum alloy foil. It is also desirable for the negative electrode current collector to have an average crystal grain size not larger than 50 μm. In this case, the mechanical strength of the current collector can be drastically increased so as to make it possible to increase the density of the negative electrode by applying the pressing under a high pressure to the negative electrode. As a result, the battery capacity can be increased. Also, since it is possible to prevent the dissolution and corrosion deterioration of the negative electrode current collector over a long over-discharge cycle under an environment of a high temperature not lower than, for example, 40° C., it is possible to suppress the elevation in the impedance of the negative electrode. Further, it is possible to improve the high-rate characteristics, the rapid charging properties, and the charge-discharge cycle characteristics of the battery. It is more desirable for the average crystal grain size of the negative electrode current collector to be not larger than 30 μm, furthermore desirably, not larger than 5 μm.

The average crystal grain size can be obtained as follows. Specifically, the texture of the current collector surface is observed with an electron microscope so as to obtain the number n of crystal grains present within an area of 1 mm×1 mm. Then, the average crystal grain area S is obtained from the formula "$S = 1 \times 10^6 / n$ (μm$^2$)", where n denotes the number of crystal grains noted above. Further, the average crystal grain size d (μm) is calculated from the area S by formula (4) given below:

$$d = 2(S/\pi)^{1/2} \quad (4)$$

The aluminum foil or the aluminum alloy foil having the average crystal grain size not larger than 50 μm can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, preferably not larger than 15 μm. Also, it is desirable for the aluminum foil to have a purity not lower than 99.99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 100 ppm.

It is possible to use, for example, a carbon material, an aluminum powder or TiO as the conductive agent. The carbon material includes, for example, acetylene black, carbon black, coke, a carbon fiber and graphite. It is more desirable for the conductive agent to be formed of coke obtained by the heat treatment at 800° C. to 2,000° C. and having an average particle diameter not larger than 10 µm, graphite, a TiO powder, and a carbon fiber having an average fiber diameter not larger than 1 µm. Further, it is desirable for the carbon material to have a specific surface area not smaller than 10 m$^2$/g as determined by the BET method utilizing the adsorption of $N_2$.

The binder includes, for example, polytetrafluoroethylene (PTFE), polyvinylidene fluoride (PVdF), a fluorinated rubber, a styrene-butadiene rubber, and a core shell binder.

Concerning the mixing ratio of the active material, the conductive agent and the binder contained in the negative electrode, it is desirable for the active material of the negative electrode to be contained in an amount of 80 to 95% by weight, for the conductive agent to be contained in an amount of 3 to 18% by weight, and for the binder to be contained in an amount of 2 to 7% by weight.

The negative electrode can be prepared by suspending first the negative electrode active material, the conductive agent, and the binder in a suitable solvent, followed by coating a current collector with the suspension thus obtained, and subsequently drying and, then, applying a hot press to the current collector coated with the dried suspension. In preparing the suspension, it is necessary to disperse uniformly the negative electrode active material particles in the solvent under the state that the addition amount of the binder is small. It is possible for the particles of the negative electrode active material to disperse uniformly in the solvent, if the binder is added in a large amount. In this case, however, the surfaces of the particles of the negative electrode active material tend to be covered with the binder so as to decrease the specific surface area of the negative electrode layer. If the binder is added in a small amount, the particles of the negative electrode active material tend to be agglomerated. Therefore, the agglomeration of the particles of the negative electrode active material is suppressed by controlling the stirring conditions such as the rotating speed of the ball mill, the stirring time and the stirring temperature so as to permit the fine particles of negative electrode active material to be dispersed uniformly, thereby increasing the specific surface area of the negative electrode layer. Further, if the conductive agent is added in a large amount, the surface of the negative electrode active material tends to be covered with the conductive agent even if the addition amount of the binder and the stirring conditions fall within appropriate ranges. The pores on the surface of the negative electrode also tend to be decreased so as to cause the specific surface area of the negative electrode layer to be decreased. Also, if the conductive agent is added in a small amount, the negative electrode active material tends to be pulverized so as to increase the specific surface area of the negative electrode layer, or the dispersion capability of the negative electrode active material tends to be lowered so as to decrease the specific surface area of the negative electrode layer. Further, it is possible to control the specific surface area of the negative electrode layer by controlling the negative electrode density.

2) Positive Electrode

The positive electrode includes a positive electrode current collector and a positive electrode layer formed on one surface or both surfaces of the current collector. The positive electrode layer contains an active material, a conductive agent and a binder.

A metal compound that contains lithium and at least one kind of metal selected from the group consisting of cobalt, nickel, manganese, iron and vanadium is used as the positive electrode active material.

The metal compound that contains lithium and at least one kind of metal selected from the group consisting of cobalt, nickel, manganese, iron and vanadium used here is defined as a compound containing lithium and at least one kind of metal selected from the group consisting of cobalt, nickel, manganese, iron and vanadium, as a metal component. It is desirable for the metal compound to have a function of absorption and release of lithium or lithium ions.

To be more specific, the metal compound includes, for example, a lithium-manganese composite oxide (e.g., $Li_xMn_2O_4$ or $Li_xMnO_2$), a lithium-nickel composite oxide (e.g., $Li_xNiO_2$), a lithium-cobalt composite oxide (e.g., $Li_xCoO_2$), a lithium-nickel-cobalt composite oxide (e.g., $Li_xNi_{1-y}Co_yO_2$), a lithium-manganese-cobalt composite oxide (e.g., $Li_xMn_yCo_{1-y}O_2$), Spinel type lithium-manganese-nickel composite oxide (e.g., $Li_xMn_{2-y}Ni_yO_4$ ($0 \leq x \leq 1$, $0.4 \leq y \leq 1$), lithium-phosphorus oxide having an olivine structure (e.g., $Li_xFePO_4$, $Li_xFe_{1-y}Mn_yPO_4$, $Li_xVPO_4F$, and $Li_xCoPO_4$), and a lithium-nickel-cobalt-manganese composite oxide having a lamellar crystal structure. Incidentally, each of the molar ratios x and y included in the chemical structures given above falls within a range of 0 to 1 unless otherwise specified.

In order to obtain a nonaqueous electrolyte battery excellent in the output performance and having a high voltage, it is desirable to use a lithium-manganese composite oxide, a lithium-nickel composite oxide, a lithium-cobalt composite oxide, a lithium-nickel-cobalt composite oxide, Spinel type lithium-manganese-nickel composite oxide, a lithium-manganese-cobalt composite oxide, a lithium iron phosphate, and a lithium-nickel-cobalt-manganese composite oxide having a lamellar crystal structure.

It is desirable for the lithium-nickel-cobalt-manganese composite oxide having a lamellar crystal structure to be represented by $Li_aNi_bCo_cMn_dO_2$ ($0 \leq a \leq 1.1$, $b+c+d=1$). It is more desirable for the molar ratios a, b, c and d to fall within the ranges of $0 \leq a \leq 1.1$, $0.1 \leq b \leq 0.5$, $0 \leq c \leq 0.9$, $0.1 \leq d \leq 0.5$.

It is desirable for the positive electrode layer to have a specific surface area $S_p$ of 0.1 m$^2$/g to 2 m$^2$/g as determined by the BET method. If the specific surface area $S_p$ is smaller than 0.1 m$^2$/g, the resistance of the positive electrode tends to be increased so as to lower the output performance of the nonaqueous electrolyte battery. On the other hand, if the specific surface area $S_p$ exceeds 2 m$^2$/g, the oxidizing and decomposing reaction of the nonaqueous electrolyte tends to be promoted so as to deteriorate the charge-discharge cycle performance of the nonaqueous electrolyte battery. It is more desirable for the specific surface area $S_p$ to fall within a range of 0.5 to 1.5 m$^2$/g.

It is desirable for the thickness $L_p$ of the positive electrode layer to fall within a range of 5 µm to 150 µm on one surface of the current collector, more desirably to fall within a range of 20 µm to 150 µm on one surface of the current collector.

The conductive agent contained in the positive electrode includes, for example, acetylene black, carbon black and graphite.

Further, the binder contained in the positive electrode includes, for example, polytetrafluoroethylene (PTFE), polyvinylidene fluoride (PVdF) and a fluorinated rubber.

Concerning the mixing ratio of the active material, the conductive agent and the binder contained in the positive electrode, it is desirable for the positive electrode active material to be contained in an amount of 80 to 95% by weight, for the conductive agent to be contained in an amount of 3 to 19% by weight, and for the binder to be contained in an amount of 1 to 7% by weight.

The positive electrode can be prepared by, for example, suspending the positive electrode active material, the conductive agent and the binder in an appropriate solvent, followed by coating a current collector formed of an aluminum foil or an aluminum alloy foil with the resultant suspension and subsequently drying and pressing the current collector coated with the suspension.

It is desirable for the aluminum foil or the aluminum alloy foil forming the positive electrode current collector to have an average crystal grain size not larger than 50 µm. It is more desirable for the average crystal grain size noted above to be not larger than 30 µm, and furthermore desirably not larger than 5 µm. Where the average crystal grain size of the aluminum foil or the aluminum alloy foil forming the positive electrode current collector is not larger than 50 µm, the mechanical strength of the aluminum foil or the aluminum alloy foil can be drastically increased so as to make it possible to press the positive electrode with a high pressure. It follows that the density of the positive electrode can be increased so as to increase the battery capacity.

The aluminum foil or the aluminum alloy foil having the average crystal grain size not larger than 50 µm can be affected in a complicated fashion by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 µm, preferably not larger than 15 µm.

3) Nonaqueous Electrolyte

The nonaqueous electrolyte includes, for example, a liquid nonaqueous electrolyte prepared by dissolving a lithium salt in an organic solvent, a gel-like nonaqueous electrolyte including the liquid nonaqueous electrolyte and a polymer material, which are in the form of a composite material, and a solid nonaqueous electrolyte including a lithium salt and a polymer material, which are in the form of a composite material. The polymer materials include, for example, polyvinylidene fluoride (PVdF), polyacrylonitrile (PAN) and polyethylene oxide (PEO).

Also, it is possible to permit the nonaqueous electrolyte to contain a room temperature molten salt formed of a noncombustible ionic liquid that is not volatile.

The lithium salt used as the electrolyte includes, for example, lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro metasulfonate ($LiCF_3SO_3$), bistrifluoromethyl sulfonylimide lithium [$LiN (CF_3SO_2)_2$], $LiN (C_2F_5SO_2)_2$, $Li (CF_3SO_2)_3C$ and $LiB[(OCO)_2]_2$. It is possible to use a single kind of the electrolyte or a plurality of different kinds of the electrolyte simultaneously in combination.

It is desirable for the lithium salt to be dissolved in the organic solvent in a concentration not lower than 1.5 mol/L. In this case, it is possible to take out a high output even under a low temperature environment. If the lithium salt concentration is lower than 1.5 mol/L, the lithium ion concentration at the interface between the positive electrode and the nonaqueous electrolyte tends to be rapidly lowered during the discharge at a high rate so as to lower the output. On the other hand, if the lithium salt concentration exceeds 2.5 mol/L, the viscosity of the nonaqueous electrolyte is increased so as to bring about the possibility that the migrating rate of the lithium ion is lowered so as to lower the output. Such being the situation, it is desirable for the lithium salt concentration to fall within a range of 1.5 mol/L to 2.5 mol/L, more desirably to fall within a range of 2.2 mol/L to 2.4 mol/L.

The organic solvent noted above includes, for example, cyclic carbonates such as propylene carbonate (PC), ethylene carbonate (EC); linear carbonates such as diethyl carbonate (DEC), dimethyl carbonate (DMC), and methyl ethyl carbonate (MEC); linear ethers such as dimethoxy ethane (DME), and diethoxy ethane (DEE); cyclic ethers such as tetrahydrofuran (THF), dioxolane (DOX); as well as γ-butyrolactone (GBL), acetonitrile (AN), and sulfolane (SL). These organic solvents can be used singly or in the form of a mixture of a plurality of the organic solvents exemplified above.

Particularly, it is desirable for the organic solvent to include at least one compound selected from the group consisting of PC, EC, DEC and GBL. In this case, it is possible to improve the output characteristics or the charge-discharge cycle characteristics of the secondary battery. In order to improve these characteristics sufficiently, it is desirable to select at least two organic solvents from the group consisting of PC, EC, DEC and GBL.

A separator can be arranged between the positive electrode and the negative electrode. The separator includes, for example, a porous film including, for example, at least one of polyethylene, polypropylene, cellulose and polyvinylidene fluoride, and an unwoven fabric made of a synthetic resin. Particularly, it is desirable for the separator to be formed of a porous film containing polyethylene or polypropylene in view of the aspect of improving the safety because the particular porous film noted above can be melted at a prescribed temperature so as to break the current.

A metallic container or a laminate film container can be used as a case for housing the positive electrode, the negative electrode and the nonaqueous electrolyte.

The metallic container noted above can be a metal can formed of aluminum, an aluminum alloy, iron or stainless steel and having a prismatic shape or having a cylindrical shape. It is desirable for the case to have a thickness not larger than 0.5 mm, more preferably not larger than 0.2 mm.

The laminate film used for forming the case includes, for example, a multi-layered film in which a metal foil is covered with a resin film. A polymer material such as polypropylene (PP), polyethylene (PE), nylon, or polyethylene terephthalate (PET) can be used for forming the resin film covering the metal foil. It is desirable for the laminate film to have a thickness not larger than 0.2 mm.

It is desirable for the metal can formed of aluminum or an aluminum alloy to have an average crystal grain size not larger than 50 µm, more preferably not larger than 30 µm, and furthermore preferably not larger than 5 µm. Where the average crystal grain size is not larger than 50 µm, it is possible to increase drastically the mechanical strength of the metal can formed of aluminum or an aluminum alloy so as to make it possible to decrease the thickness of the metal can used as the case. As a result, it is possible to realize a battery that is light in weight, high in output, excellent in reliability over a long period, and adapted for mounting on a vehicle. It is desirable for the aluminum foil to have a purity of at least 99.99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 100 ppm. In this case, it is possible to improve drastically the battery in respect of weight reduction, reliability for a long time in a high-temperature environment, and heat dissipating properties.

Figure 2:
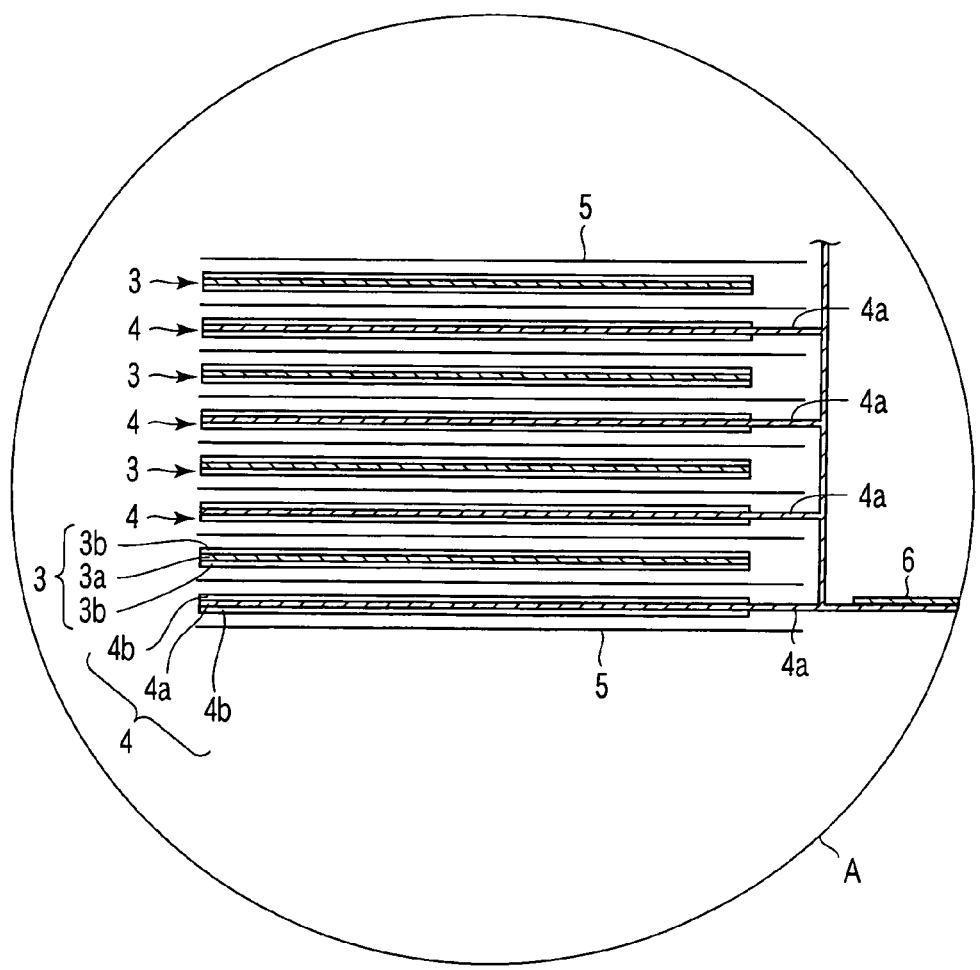
FIG. 2 is cross sectional view showing in a magnified fashion a circular region A shown in FIG. 1.
Figure 3:
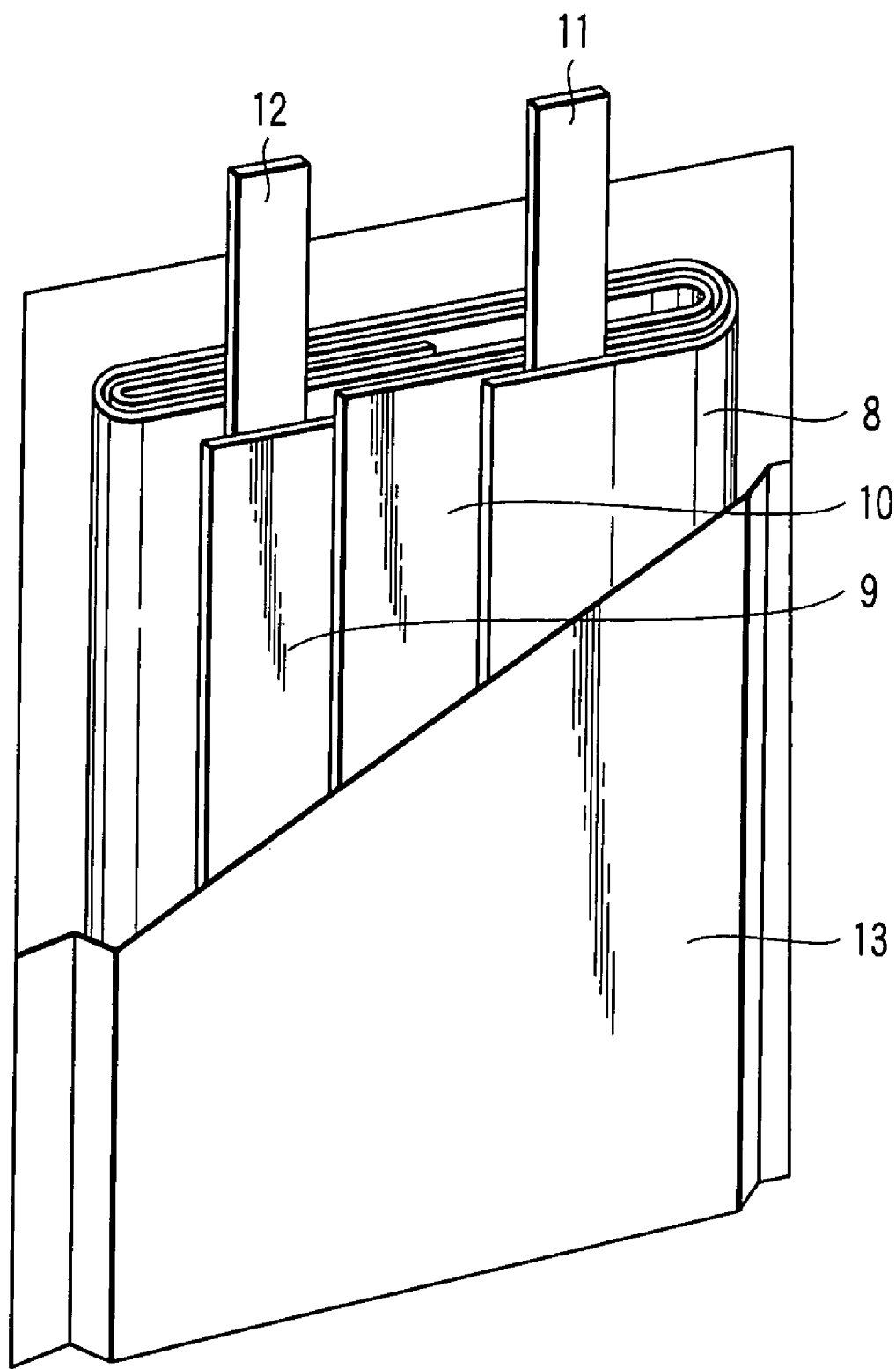
FIG. 3 is an oblique view, partly broken away, schematically showing the construction of a flattened type nonaqueous electrolyte battery according to another embodiment of the nonaqueous electrolyte battery of the present invention.

FIGS. 1 to 3 collectively show the construction of the nonaqueous electrolyte battery according to one embodiment of the present invention. To be more specific, FIG. 1 is an oblique view, partly broken away, schematically showing the construction of a flattened type nonaqueous electrolyte secondary battery according to one embodiment of the present invention, FIG. 2 is a cross sectional view showing in a magnified fashion the construction of the circular region A of the secondary battery shown in FIG. 1, and FIG. 3 is an oblique view schematically showing the construction of a flattened type nonaqueous electrolyte secondary battery according to another embodiment of the present invention.

As shown in FIG. 1, a laminate type electrode group 2 is housed in a case 1 formed of a laminate film. As shown in FIG. 2, the laminate type electrode group 2 comprises a positive electrode 3 and a negative electrode 4, which are laminated one upon the other with a separator 5 interposed between the positive electrode 3 and the negative electrode 4. Each of a plurality of positive electrodes 3 includes a positive electrode current collector 3a and positive electrode layers 3b formed on both surfaces of the positive electrode current collector 3a and containing a positive electrode active material. Likewise, each of a plurality of negative electrodes 4 includes a negative electrode current collector 4a and negative electrode layers 4b formed on both surfaces of the negative electrode current collector 4a and containing a negative electrode active material. One side of the negative electrode current collector 4a included in each negative electrode 4 protrudes from the positive electrode 3. The negative electrode current collector 4a protruding from the positive electrode 3 is electrically connected to a band-like negative electrode terminal 6. The distal end portion of the band-like negative electrode terminal 6 is withdrawn from the case 1 to the outside. Also, one side of the positive electrode current collector 3a included in the positive electrode 3 is positioned on the side opposite to the protruding side of the negative electrode current collector 4a and is protruded from the negative electrode 4, though the particular construction is not shown in the drawing. The positive electrode current collector 3a protruding from the negative electrode 4 is electrically connected to a band-like positive electrode terminal 7. The distal end portion of the band-like positive electrode terminal 7 is positioned on the side opposite to the side of the negative electrode terminal 6 and is withdrawn from the side of the case 1 to the outside.

As shown in FIG. 3, an electrode group has a flattened and spirally wound structure comprising a positive electrode 8, a negative electrode 9 and a separator 10 interposed between the positive electrode 8 and the negative electrode 9. The electrode group is prepared by spirally winding a laminate structure comprising the positive electrode 8, the negative electrode 9 and the separator 10 in a flattened shape, followed by applying a heat press to the wound laminate structure. It is possible for the positive electrode 8, the negative electrode 9 and the separator 10 included in the electrode group to be made integral by using a polymer having an adhesivity. A band-like positive electrode terminal 11 is electrically connected to the positive electrode 8. On the other hand, a band-like negative electrode terminal 12 is electrically connected to the negative electrode 9. The electrode group is housed in a case 13 formed of a laminate film such that the edge portions of the positive electrode terminal 11 and the negative electrode terminal 12 are allowed to protrude from the case 13. The positive electrode terminal 11 and the negative electrode terminal 12 are withdrawn to the outside from the same side of the case 13. Incidentally, the case 13 formed of a laminate film is sealed by a heat seal.

It is also possible to use a battery pack comprising a battery module comprising a plurality of nonaqueous electrolyte batteries as unit cells. The nonaqueous electrolyte battery according to an embodiment of the present invention is particularly adapted for use in the case where the protective circuit detects the battery voltage because the positive electrode potential or the negative electrode potential in the nonaqueous electrolyte battery can be controlled easily by the detection of the battery voltage.

It is possible to connect the unit cells constituting the battery module either in series or in parallel. Also, it is possible to use the flattened type nonaqueous electrolyte battery shown in FIG. 1 or FIG. 3 as the unit cell.

Figure 4:
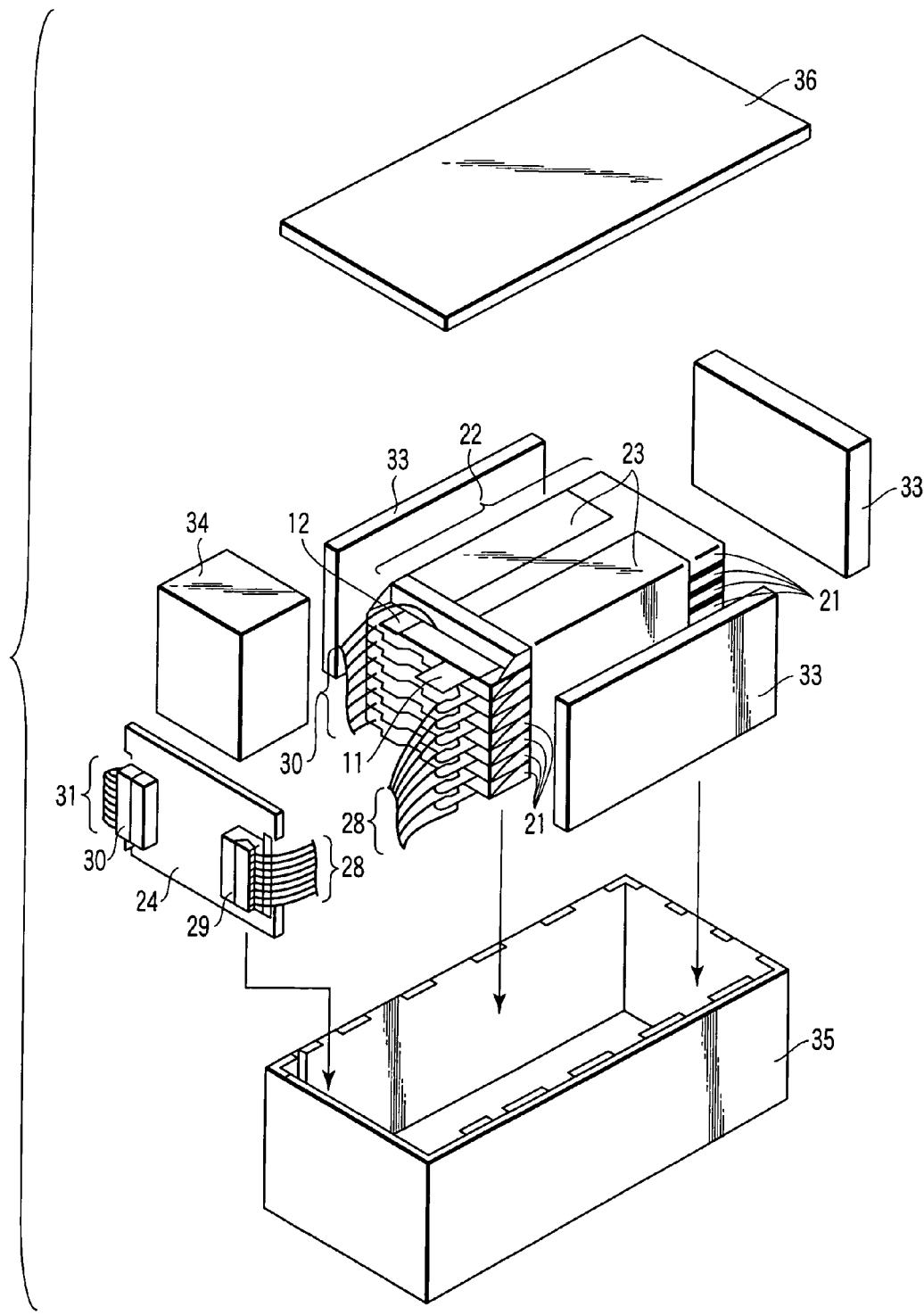
FIG. 4 is an oblique view showing in a dismantled fashion the construction of a battery pack according to one embodiment of the present invention.

Each of a plurality of unit cells 21 included in the battery pack shown in FIG. 4 is formed of a flattened type nonaqueous electrolyte battery constructed as shown in FIG. 3. The plural unit cells 21 are stacked one upon the other in the thickness direction in a manner to align the protruding directions of the positive electrode terminals and the negative electrode terminals. As shown in FIG. 4, the unit cells 21 are connected in series so as to form a battery module 22. The unit cells 21 forming the battery module 22 are made integral by using an adhesive tape 23.

Figure 5:
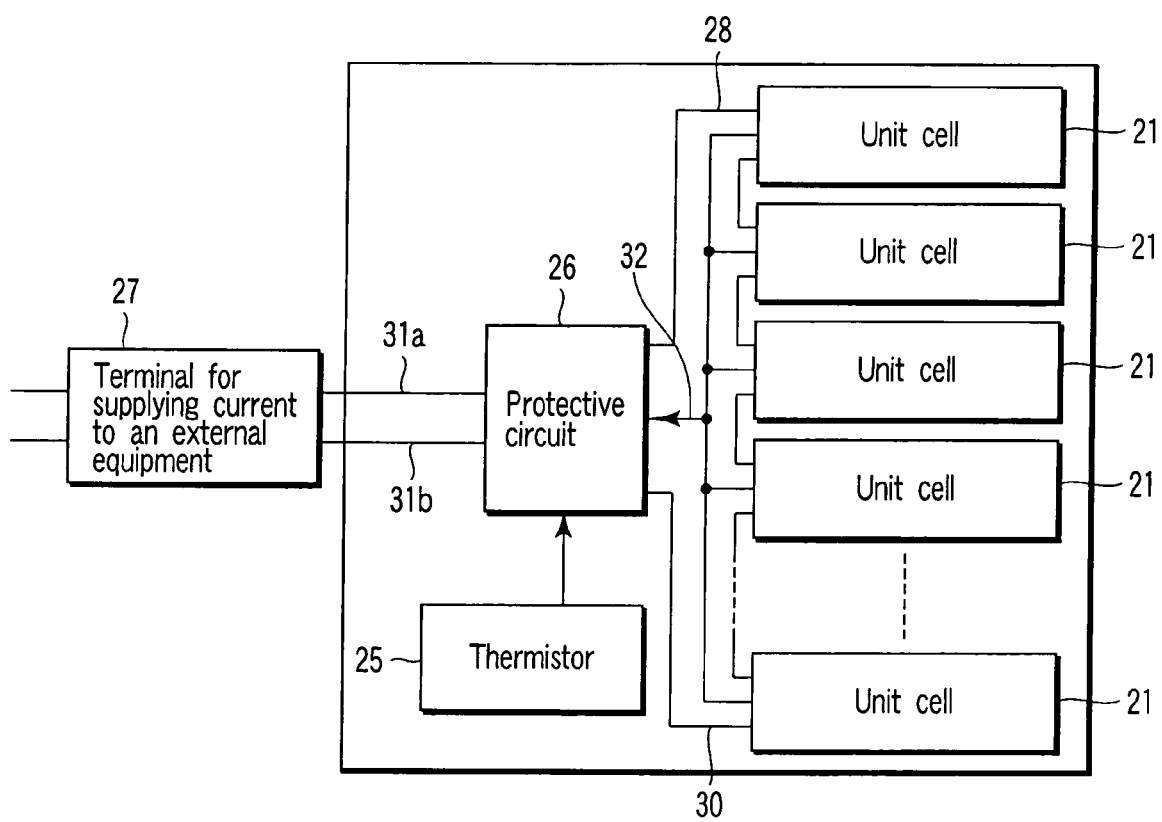
FIG. 5 is block diagram showing the electric circuit of the battery pack shown in FIG. 4.

A printed wiring board 24 is arranged on the side surface of the battery module 22 toward which protrude the positive electrode terminals 11 and the negative electrode terminals 12. As shown in FIG. 5, a thermistor 25, a protective circuit 26 and a terminal 27 for current supply to the external equipment are connected to the printed wiring board 24.

As shown in FIGS. 4 and 5, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium electrodes used as reference electrodes are inserted into the unit cells 21.

In the case of FIG. 5, a wiring 32 is connected to each of the unit cells 21 for detecting the voltage, and the detection signal is transmitted through these wirings 32 to the protective circuit 26. Specifically, the protective circuit 26 is provided with a battery voltage monitoring circuit section. Each of the unit cells 21 is connected to the battery voltage monitoring circuit section via a wiring 32. According to the particular construction, the battery voltage of each of the unit cells 21 can be detected by the protective circuit 26.

Further, in the case shown in FIG. 4, all the unit cells 21 included in the battery module 22 are detected in terms of voltage. Although it is particularly preferable that the voltages of all of the unit cells 21 of the battery module 22 should be detected, it may be sufficient to check the voltages of only some of the unit cells 21.

Protective sheets 33 each formed of rubber or resin are arranged on the three of the four sides of the battery module 22, though the protective sheet 33 is not arranged on the side toward which protrude the positive electrode terminals 11 and the negative electrode terminals 12. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk so as to fix the battery module 22.

The unit cells 21 shown in FIGS. 4 and 5 are connected in series. However, it is also possible to connect the unit cells 21 in parallel so as to increase the cell capacity. Of course, it is possible to connect the battery packs in series and in parallel.

Also, the construction of the battery pack can be changed appropriately depending on the use of the battery pack.

It is desirable for the battery pack to be used under a high temperature environment. To be more specific, the battery pack can be mounted to, for example, vehicles such as a hybrid electric automobile having two to four wheels, an electric automobile having two to four wheels, and an assistant bicycle. And the battery pack can be mounted as an emergency power supply of an electronic device.

Incidentally, when mounted to a vehicle, the battery pack is required to exhibit good charge-discharge cycle characteristics under a low temperature environment not higher than −20° C. Also, when used as an emergency power supply of an electronic device, the battery pack is required to exhibit good charge-discharge cycle characteristics under a low temperature environment of −20 to 0° C. As demonstrated in the Examples described in the following, the battery pack of the examples permits improving the charge-discharge cycle characteristics even under a low temperature environment of −30° C. and, thus, can be suitably mounted to the vehicle and can be used for the emergency power supply of the electronic device. Particularly, it is desirable to mount the battery pack to a vehicle.

Some Examples of the present invention will now be described in detail with reference to the accompanying drawings. Needless to say, however, the technical scope of the present invention is not limited to the following Examples.

EXAMPLE 1

Prepared as a positive electrode active material was a lithium-nickel-cobalt-manganese composite oxide represented by $LiNi_{1/3}Co_{1/3}Mn_{1/3}O_2$, having a lamellar structure and having an average particle diameter of 3 μm. Then, added to the positive electrode active material were a graphite powder, which was used as a conductive agent in an amount of 8% by weight based on the amount of the positive electrode, and a PVdF, which was used as a binder in an amount of 5% by weight based on the amount of the positive electrode. The resultant mixture was dispersed in n-methyl pyrrolidone (NMP) used as a solvent so as to prepare a slurry. Then, both surfaces of an aluminum alloy foil having a purity of 99%, having a thickness of 15 μm and having an average crystal grain size of 10 μm were coated with the resultant slurry, followed by drying the coated slurry and, then, pressing the aluminum alloy foil having the both surfaces coated with the slurry so as to obtain a positive electrode having the dried slurry coated on the both surfaces. The dried slurry, which constituted the positive electrode layer and formed on one surface of the aluminum alloy foil was found to have a thickness $L_p$ of 43 μm. The positive electrode was found to have an electrode density of 3.0 g/cm³. The specific surface area $S_p$ of the positive electrode layer as determined by the BET method was found to be 0.5 m²/g.

On the other hand, mixed were a powder of lithium titanate represented by $Li_4Ti_5O_{12}$, having a spinel structure, and having an average particle diameter of 0.3 μm, a coke powder having an average particle diameter of 0.4 μm, an acetylene black, and PVdF used as a binder in a mixing ratio by weight of 90:6:2:2. The Spinel type lithium titanate powder was found to have a BET specific surface area of 15 m²/g, and a lithium ion insertion potential of 1.55 V (vs. Li/Li⁺). Also, the coke powder was found to have a BET specific surface area of 50 m²/g. The mixture thus obtained was dispersed in a n-methyl pyrrolidone (NMP) solvent, and the resultant dispersion was stirred by using a ball mill for two hours under the rotating speed of 1,000 rpm so as to obtain a slurry. Then, an aluminum foil having a purity of 99.99%, having a thickness of 10 μm, and having an average crystal grain size of 10 μm was coated with the slurry thus obtained, followed by drying the coated slurry and, then, subjecting the aluminum foil coated with the dried slurry to a hot press process so as to obtain a negative electrode. The negative electrode thus obtained was found to have the slurry coating amount of 13 mg/cm² on one surface, the thickness $L_n$ of the negative electrode layer on one surface being 59 μm, and an electrode density of 2.2 g/cm³. The porosity of the negative electrode excluding the current collector was found to be 35%. Also, the BET specific surface area $S_n$ of the negative electrode layer was found to be 10 m²/g. As pointed out above, the thickness $L_n$ of the negative electrode layer on one surface was 59 μm. On the other hand, the thickness $L_p$ of the positive electrode layer on one surface was 43 μm as pointed out previously. It follows that the ratio $L_p/L_n$ of the battery was 0.729.

On the other hand, the positive electrode was covered with a separator formed of a polyethylene porous film having a thickness of 12 μm, and the negative electrode was disposed to face the positive electrode with the separator interposed therebetween, thereby forming a laminate structure. The laminate structure thus formed was spirally wound so as to obtain an electrode group, which was further pressed so as to mold the electrode group in a flattened shape. The flattened electrode group was housed in a case formed of an aluminum foil-containing laminate film having a thickness of 0.1 mm.

On the other hand, a liquid nonaqueous electrolyte was prepared by dissolving lithium tetrafluoro borate ($LiBF_4$) in a concentration of 2 mol/L in a mixed solvent prepared by mixing ethylene carbonate (EC) and γ-butyrolactone (BGL) at a mixing ratio by volume of 25:75. The liquid nonaqueous electrolyte thus prepared was poured into the electrode group housed in the case so as to obtain a flattened type nonaqueous electrolyte battery constructed as shown in FIG. 1 and having a thickness of 3.8 mm, a width of 35 mm and a height of 63 mm.

Described in the following are the measuring methods of the particle diameter and the lithium ion insertion potential of the negative electrode active material, the specific surface area of each of the negative electrode active material, the negative electrode layer and the positive electrode layer, the thickness of each of the negative electrode layer and the positive electrode layer, and the porosity of the negative electrode.

<Particle Diameter>

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, so as to analyze the particle size distribution data.

<Lithium Ion Insertion Potential>

The negative electrode was cut into small pieces each sized at 1 cm×1 cm so as to obtain working electrodes. The working electrode was disposed to face a counter electrode formed of a lithium metal foil sized at 2 cm×2 cm with a glass filter (separator) interposed therebetween, and a lithium metal used as a reference electrode was inserted so as not to be brought into contact with any of the working electrode and the counter electrode. These electrodes were put in a glass cell of a three pole type such that each of the working electrode, the counter electrode and the reference electrode was connected to the terminal of the glass cell. Under the particular condition, 50 mL of an electrolysis solution, which was prepared by dissolving $LiBF_4$ in a concentration of 2 mol/L in a mixed solvent prepared by mixing EC and GBL in a mixing ratio by volume of 25:75, was poured into the glass cell such that the separator and the electrodes were sufficiently impregnated with the electrolysis solution, followed by hermetically closing the glass cell. The glass cell thus manufactured was arranged in a constant temperature bath maintained at 25° C. so as to measure the lithium ion insertion potential of the working electrode at the time when the glass cell was charged with a current density of 0.1 $mA/cm^2$. Incidentally, a constant temperature bath type No. EC-45 MTP manufactured by Hitachi Ltd. was used as the constant temperature bath.

<BET Specific Surface Area by $N_2$ Adsorption>

Prepared was 1 g of a powdery negative electrode active material for the measurement of the BET specific surface area of the negative electrode active material. Two pieces of the negative electrode each sized at 2×2 $cm^2$ were taken out and used as samples for measuring the BET specific surface area $S_n$ of the negative electrode layer. Likewise, two pieces of the positive electrode each sized at 2×2 $cm^2$ were taken out and used as samples for measuring the BET specific surface area $S_p$ of the positive electrode layer. Used was a BET specific surface area measuring apparatus manufactured by Yuasa Ionics Inc., and a nitrogen gas was used as the adsorbing gas.

<Thickness of the Active Material-Containing Layer>

The thickness of the negative electrode was measured at optional 20 points so as to obtain the average thickness. After the negative electrode layers were peeled off from both surfaces of the current collector, the surface of the current collector was washed with acetone, followed by measuring the thickness of the current collector at optional 20 points so as to obtain the average thickness of the current collector. The average thickness of the current collector was subtracted from the average thickness of the negative electrode, followed by multiplying the difference between the average thickness of the negative electrode and the average thickness of the current collector by ½ so as to obtain the thickness $L_n$ of the negative electrode layer.

Likewise, the thickness of the positive electrode was measured at optional 20 points so as to obtain the average thickness. After the positive electrode layers were peeled off from both surfaces of the current collector, the surface of the current collector was washed with acetone, followed by measuring the thickness of the current collector at optional 20 points so as to obtain the average thickness of the current collector. The average thickness of the current collector was subtracted from the average thickness of the positive electrode, followed by multiplying the difference between the average thickness of the positive electrode and the average thickness of the current collector by ½ so as to obtain the thickness $L_p$ of the positive electrode layer.

<Porosity of the Negative Electrode>

The porosity of the negative electrode was calculated on the basis of the difference in volume between the negative electrode layer that was tested and the negative electrode layer at the time when the porosity was 0%. In this calculation, the difference noted above was regarded as the pore volume. Incidentally, where the negative electrode layers were formed on both surfaces of the current collector, the volume of the negative electrode layer used for the calculation noted above represents the sum of the volumes of the negative electrode layers on both surfaces of the current collector.

EXAMPLES 2 TO 14

A flattened type nonaqueous electrolyte battery was manufactured as in Example 1, except that the composition of the positive electrode active material, the thickness $L_p$ and the specific surface area $S_p$ of the positive electrode layer, the thickness $L_n$ and the specific surface area $S_n$ of the negative electrode layer, the thickness ratio ($L_p/L_n$), the specific surface area ratio ($S_n/S_p$), and the lithium ion concentration were set as shown in Table 1.

EXAMPLE 15

A flattened type nonaqueous electrolyte battery was manufactured as in Example 2, except that $TiO_2$ having an average particle diameter of 0.1 μm, a lithium ion insertion potential falling within a range of 2.0 V to 1.0 V (vs. Li/Li$^+$) and a low crystallinity was used as the negative electrode active material, and that the specific surface area $S_p$ of the positive electrode layer, the specific surface area $S_n$ of the negative electrode layer, and the specific surface area ratio ($S_n/S_p$) were set as shown in Table 1.

EXAMPLE 16

A flattened type nonaqueous electrolyte battery was manufactured as in Example 2, except that a titanium-containing metal composite oxide having a microcrystalline $TiO_2$ phase and an amorphous $TiO_2$ phase, represented by $TiO_2$—$P_2O_5$—$SnO_2$—NiO—CuO, having an average particle diameter of 0.1 μm and having a lithium ion insertion potential falling within a range of 2.0 V to 1.0 V (vs. Li/Li$^+$) was used as the negative electrode active material, and that the specific surface area $S_p$ of the positive electrode layer, the specific surface area $S_n$ of the negative electrode layer, and the specific surface area ratio ($S_n/S_p$) were set as shown in Table 1.

COMPARATIVE EXAMPLES 1 TO 4

A flattened type nonaqueous electrolyte battery was manufactured as in Example 1, except that the thickness $L_p$ and the specific surface area $S_p$ of the positive electrode layer, the thickness $L_n$ and the specific surface area $S_n$ of the negative electrode layer, the thickness ratio ($L_p/L_n$), the specific surface area ratio ($S_n/S_p$), and the lithium salt concentration were set as shown in Table 1.

COMPARATIVE EXAMPLE 5

A flattened type nonaqueous electrolyte battery was manufactured as in Example 1, except that $LiFePO_4$ was used as the positive electrode active material, and that the thickness $L_p$ and the specific surface area $S_p$ of the positive electrode layer, the thickness $L_n$ and the specific surface area $S_n$ of the negative electrode layer, the thickness ratio ($L_p/L_n$), the specific surface area ratio ($S_n/S_p$), and the lithium salt concentration were set as shown in Table 1.

COMPARATIVE EXAMPLE 6

A flattened type nonaqueous electrolyte battery was manufactured as in Example 1, except that $LiCoO_2$ was used as the positive electrode active material, that a mesophase-based carbon fiber was used as the negative electrode active material, and that the thickness $L_p$ and the specific surface area $S_p$ of the positive electrode layer, the thickness $L_n$ and the specific surface area $S_n$ of the negative electrode layer, the thickness ratio ($L_p/L_n$), the specific surface area ratio ($S_n/S_p$), and the lithium salt concentration were set as shown in Table 1.

COMPARATIVE EXAMPLE 7

A flattened type nonaqueous electrolyte battery was manufactured as in Example 1, except that $LiCoO_2$ was used as the positive electrode active material, that a mesophase-based carbon fiber was used as the negative electrode active material, and that the thickness $L_p$ and the specific surface area $S_p$ of the positive electrode layer, the thickness $L_n$ and the specific surface area $S_n$ of the negative electrode layer, the thickness ratio ($L_p/L_n$), the specific surface area ratio ($S_n/S_p$), and the lithium salt concentration were set as shown in Table 1.

Each of the nonaqueous electrolyte batteries manufactured in the Examples and the Comparative Examples described above was subjected to a charge-discharge cycle test under a temperature environment of −30° C. by repeating the operation that the nonaqueous electrolyte battery was rapidly charged to 2.8 V under a constant current of 1.2 A, followed by discharging the nonaqueous electrolyte battery to 0 V under a constant current of 0.6 A.

Also measured were the initial discharge capacity during the discharge under a current of 0.6 A under a temperature environment of −30° C. and the capacity retention ratio during the discharge at a high current rate of 3 A under a temperature environment of −30° C. Table 1 also shows the experimental data. The capacity retention ratio given in Table 1 denotes the value obtained on the basis that the capacity during the discharge at a current rate of 0.6 A at 25° C. was set at 100%.

TABLE 1

| | Composition of positive electrode active material | $L_p$ (μm) | $L_n$ (μm) | ($L_p/L_n$) | $S_n$ (m²/g) | $S_p$ (m²/g) | ($S_n/S_p$) | Li concentration (moL/L) | Discharge capacity at −30° C. (mAh) | Discharge capacity retention ratio at −30° C. (%) | Cycle life at −30° C. (times) |
|---|---|---|---|---|---|---|---|---|---|---|---|
| Example 1 | $LiNi_{1/3}Co_{1/3}Mn_{1/3}O_2$ | 43 | 59 | 0.729 | 10 | 0.5 | 20 | 2.0 | 600 | 90 | 1500 |
| Example 2 | $LiNi_{1/3}Co_{1/3}Mn_{1/3}O_2$ | 57 | 59 | 0.966 | 10 | 0.5 | 20 | 2.0 | 600 | 55 | 800 |
| Example 3 | $LiNi_{1/3}Co_{1/3}Mn_{1/3}O_2$ | 29.5 | 59 | 0.5 | 10 | 0.5 | 20 | 2.0 | 420 | 55 | 500 |
| Example 4 | $LiNi_{1/3}Co_{1/3}Mn_{1/3}O_2$ | 35.4 | 59 | 0.6 | 10 | 0.5 | 20 | 2.0 | 500 | 60 | 600 |
| Example 5 | $LiNi_{1/3}Co_{1/3}Mn_{1/3}O_2$ | 53.1 | 59 | 0.9 | 10 | 0.5 | 20 | 2.0 | 620 | 82 | 1200 |
| Example 6 | $LiNi_{1/3}Co_{1/3}Mn_{1/3}O_2$ | 43 | 59 | 0.729 | 10 | 0.5 | 20 | 1.5 | 600 | 50 | 1000 |
| Example 7 | $LiNi_{1/3}Co_{1/3}Mn_{1/3}O_2$ | 43 | 59 | 0.729 | 10 | 0.5 | 20 | 2.5 | 610 | 92 | 1200 |
| Example 8 | $LiNi_{1/3}Co_{1/3}Mn_{1/3}O_2$ | 43 | 59 | 0.729 | 2 | 0.1 | 20 | 2.0 | 580 | 70 | 800 |
| Example 9 | $LiNi_{1/3}Co_{1/3}Mn_{1/3}O_2$ | 100 | 150 | 0.667 | 50 | 0.5 | 100 | 2.0 | 600 | 50 | 1000 |
| Example 10 | $LiNi_{1/3}Co_{1/3}Mn_{1/3}O_2$ | 28 | 30 | 0.933 | 0.5 | 0.1 | 5 | 2.0 | 500 | 50 | 1000 |
| Example 11 | $LiNi_{1/3}Co_{1/3}Mn_{1/3}O_2$ | 43 | 59 | 0.729 | 50 | 2 | 25 | 2.0 | 580 | 92 | 1300 |
| Example 12 | $LiCoO_2$ | 50 | 65 | 0.77 | 10 | 0.3 | 33 | 2.0 | 600 | 95 | 1300 |
| Example 13 | $LiNi_{0.8}Co_{0.15}Al_{0.5}O_2$ | 40 | 59 | 0.678 | 10 | 0.5 | 20 | 2.0 | 650 | 80 | 800 |
| Example 14 | $LiFePO_4$ | 40 | 59 | 0.678 | 10 | 2 | 5 | 2.0 | 500 | 80 | 900 |
| Example 15 | $LiNi_{1/3}Co_{1/3}Mn_{1/3}O_2$ | 57 | 59 | 0.966 | 10 | 1 | 10 | 2.0 | 620 | 50 | 700 |
| Example 16 | $LiNi_{1/3}Co_{1/3}Mn_{1/3}O_2$ | 58 | 59 | 0.983 | 3 | 0.5 | 6 | 2.0 | 580 | 50 | 600 |
| Comparative Example 1 | $LiNi_{1/3}Co_{1/3}Mn_{1/3}O_2$ | 59 | 59 | 1 | 10 | 0.5 | 20 | 2.0 | 500 | 40 | 300 |
| Comparative Example 2 | $LiNi_{1/3}Co_{1/3}Mn_{1/3}O_2$ | 23 | 59 | 0.39 | 10 | 0.5 | 20 | 2.0 | 200 | 20 | 50 |
| Comparative Example 3 | $LiNi_{1/3}Co_{1/3}Mn_{1/3}O_2$ | 43 | 59 | 0.729 | 0.5 | 0.3 | 1.7 | 2.0 | 500 | 50 | 200 |
| Comparative Example 4 | $LiNi_{1/3}Co_{1/3}Mn_{1/3}O_2$ | 43 | 59 | 0.729 | 10.1 | 0.1 | 101 | 2.0 | 300 | 5 | 100 |
| Comparative Example 5 | $LiFePO_4$ | 65 | 59 | 1.1 | 0.4 | 0.5 | 0.8 | 2.0 | 500 | 10 | 150 |
| Comparative Example 6 | $LiCoO_2$ | 23 | 65 | 0.39 | 1 | 2.5 | 0.4 | 1.0 | 250 | 30 | 80 |
| Comparative Example 7 | $LiCoO_2$ | 43 | 59 | 0.729 | 10 | 0.5 | 20 | 2.0 | 20 | 5 | 3 |

As apparent from Table 1, the nonaqueous electrolyte battery for each of Examples 1 to 16 was found to be superior to the nonaqueous electrolyte battery for each of Comparative Examples 1 to 7 in the charge-discharge cycle life under a low temperature environment of −30° C.

It can be understood by the comparison of Examples 1 to 5 that, where the thickness ratio ($L_p/L_n$) is not smaller than 0.5 and smaller than 1, the initial capacity under −30° C., the capacity retention ratio during the discharge under a high current rate of 3A, and the charge-discharge cycle life are improved with increase in the thickness ratio ($L_p/L_n$). Particularly, in Examples 1 and 5, in which the thickness ratio ($L_p/L_n$) is not smaller than 0.7 and not larger than 0.9, it was found possible to obtain excellent charge-discharge cycle characteristics.

Also, it can be understood by the comparison of Examples 1, 9, 10 and 11 that it is possible to obtain an excellent charge-discharge cycle characteristics in the cases where the specific surface area ratio ($S_n/S_p$) falls within a range of 5 to 100. Particularly, the nonaqueous electrolyte battery for each of Examples 1 and 11, in which the specific surface area ratio ($S_n/S_p$) was not smaller than 10 and not larger than 80, the capacity retention ratio was found to be excellent during the discharge at a high current rate of 3A.

It can also be understood by the comparison among the Examples 1, 12, 13 and 14 that the nonaqueous electrolyte batteries for Examples 1 and 12, in which a lithium-nickel-cobalt-manganese composite oxide or a lithium-cobalt composite oxide was used as the positive electrode active material, were excellent in the capacity retention ratio during the discharge at a high current rate of 3A and the charge-discharge cycle life.

On the other hand, the nonaqueous electrolyte batteries for Comparative Examples 1 and 2, in which the thickness ratio ($L_p/L_n$) failed to fall within a range of 0.5 to smaller than 1, and the nonaqueous electrolyte batteries for Comparative Examples 3 and 4, in which the specific surface area ratio ($S_n/S_p$) failed to fall within a range of 5 to 100, were found to be inferior to the nonaqueous electrolyte batteries for Examples 1 to 16 in the charge-discharge cycle life.

The experimental data for Comparative Example 5 support that, if the thickness ratio ($L_p/L_n$) and the specific surface area ratio ($S_n/S_p$) fails to fall within the ranges given above, the nonaqueous electrolyte battery is rendered poor in its characteristics even if the composition of the positive electrode active material is changed.

The nonaqueous electrolyte battery for each of Comparative Examples 6 and 7 comprises a carbonaceous material as the negative electrode active material. It should be noted that the nonaqueous electrolyte battery for Comparative Example 7 was found to be inferior to the nonaqueous electrolyte battery for Comparative Example 6 in spite of the situation that the thickness ratio ($L_p/L_n$), the specific surface area ratio ($S_n/S_p$), and the specific surface area $S_n$ of the nonaqueous electrolyte battery for Comparative Example 7 were set to fall within the ranges equal to those for Examples.

As described above in detail, according to one embodiment of the present invention, it is possible to provide a nonaqueous electrolyte battery excellent in the charge-discharge cycle characteristics under a low temperature environment not higher than −20° C., a battery pack comprising the nonaqueous electrolyte battery, and a vehicle having the battery pack mounted thereto.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
a positive electrode comprising a positive electrode layer containing a metal compound, a conductive agent and a binder, the metal compound containing lithium and at least one metal selected from the group consisting of cobalt, nickel, manganese, iron and vanadium;
a negative electrode comprising a negative electrode layer containing a conductive agent, a binder and a negative electrode active material which is a titanium-containing metal composite oxide having a Li ion insertion potential not lower than 0.4 V (vs. Li/Li$^+$), the negative electrode layer having a porosity of 20 to 50%; and
a nonaqueous electrolyte;
wherein the positive electrode layer and the negative electrode layer satisfy formulas (1) to (3) given below:

$$0.5 m^2/g \leq S_n \leq 50 m^2/g \quad (1)$$

$$5 \leq (S_n/S_p) \leq 100 \quad (2)$$

$$0.5 \leq (L_p/L_n) < 1 \quad (3)$$

where $S_n$ denotes a specific surface area (m$^2$/g) of the negative electrode layer as determined by the BET method, $S_p$ denotes a specific surface area (m$^2$/g) of the positive electrode layer as determined by the BET method, $L_n$ denotes a thickness (μm) of the negative electrode layer, and $L_p$ denotes a thickness (μm) of the positive electrode layer.

2. The nonaqueous electrolyte battery according to claim 1, wherein the specific surface area $S_p$ of the positive electrode layer as determined by the BET method falls within a range of 0.1 to 2 m$^2$/g.

3. The nonaqueous electrolyte battery according to claim 1, wherein the specific surface area $S_n$ of the negative electrode layer as determined by the BET method falls within a range of 5 to 50 m$^2$/g.

4. The nonaqueous electrolyte battery according to claim 1, wherein the specific surface area ratio ($S_n/S_p$) falls within a range of 10 to 80.

5. The nonaqueous electrolyte battery according to claim 1, wherein the thickness ratio ($L_p/L_n$) falls within a range of 0.6 to 0.9.

6. The nonaqueous electrolyte battery according to claim 1, wherein each of the thickness $L_p$ of the positive electrode layer and the thickness $L_n$ of the negative electrode layer falls within a range of 5 to 150 μm.

7. The nonaqueous electrolyte battery according to claim 1, wherein the metal compound is represented by Li$_a$Ni$_b$Co$_c$Mn$_d$O$_2$, where the molar ratios a, b, c and d are: $0 \leq a \leq 1.1$, b+c+d=1.

8. The nonaqueous electrolyte battery according to claim 1, wherein the metal compound is represented by Li$_a$Ni$_b$Co$_c$Mn$_d$O$_2$, where the molar ratios a, b, c and d are: $0 \leq a \leq 1.1$, b+c+d=1, and the thickness ratio of ($L_p/L_n$) falls within a range of 0.7 to 0.9.

9. The nonaqueous electrolyte battery according to claim 1, wherein the titanium-containing metal composite oxide includes lithium-titanium oxide having a spinel structure.

10. The nonaqueous electrolyte battery according to claim 1, wherein the titanium-containing metal composite oxide is represented by Li$_{4+x}$Ti$_5$O$_{12}$ ($-1 \leq x \leq 3$) or Li$_{2+x}$Ti$_3$O$_7$ ($-1 \leq x \leq 3$).

11. The nonaqueous electrolyte battery according to claim 1, wherein the metal compound is a lithium-phosphorus oxide having an olivine structure.

12. The nonaqueous electrolyte battery according to claim 11, wherein the lithium-phosphorus oxide is $Li_xFePO_4$ ($0 \leq x \leq 1$), $Li_xFe_{1-y}Mn_yPO_4$ ($0 \leq x \leq 1, 0 \leq y \leq 1$), $Li_xVPO_4F$ ($0 \leq x \leq 1$), or $Li_xCoPO_4$ ($0 \leq x \leq 1$).

13. The nonaqueous electrolyte battery according to claim 1, wherein the metal compound is a lithium-manganese composite oxide.

14. The nonaqueous electrolyte battery according to claim 13, wherein the lithium-manganese composite oxide $Li_xMn_2O_4$ ($0 \leq x \leq 1$) or $Li_xMnO_2$ ($0 \leq x \leq 1$).

15. The nonaqueous electrolyte battery according to claim 1, wherein the titanium-containing metal composite oxide contains at least one element selected from the group consisting of P, V, Sn, Cu, N: and Fe.

16. The nonaqueous electrolyte battery according to claim 1, wherein the negative electrode active material is formed of particles having an average particle diameter not larger than 1 μm.

17. The nonaqueous electrolyte battery according to claim 1, wherein the negative electrode comprises a negative electrode current collector supporting the negative electrode layer, and the negative electrode current collector is formed of an aluminum foil or an aluminum alloy foil.

18. The nonaqueous electrolyte battery according to claim 17, wherein each of the aluminum foil and the aluminum alloy foil has an average crystal grain size not larger than 50 μm.

19. The nonaqueous electrolyte battery according to claim 1, wherein the nonaqueous electrolyte comprises at least two nonaqueous solvents selected from the group consisting of propylene carbonate, ethylene carbonate, diethyl carbonate, and γ-butyrolactone.

20. The nonaqueous electrolyte battery according to claim 1, wherein the nonaqueous electrolyte contains lithium salt in a concentration falling within a range of 1.5 to 2.5 mol/L.

21. A battery pack comprising nonaqueous electrolyte batteries, each of the nonaqueous electrolyte batteries comprising:
a positive electrode comprising a positive electrode layer containing a metal compound, a conductive agent and a binder, the metal compound containing lithium and at least one kind of metal selected from the group consisting of cobalt, nickel, manganese, iron and vanadium;
a negative electrode comprising a negative electrode layer containing a conductive agent, a binder and a negative electrode active material which is a titanium-containing metal composite oxide having a Li ion insertion potential not lower than 0.4 V (vs. Li/Li$^+$), the negative electrode layer having a porosity of 20 to 50%; and
a nonaqueous electrolyte;
wherein the positive electrode layer and the negative electrode layer satisfy formulas (1) to (3) given below:

$$0.5 m^2/g \leq S_n \leq 50 m^2/g \tag{1}$$

$$5 \leq (S_n/S_p) \leq 100 \tag{2}$$

$$0.5 \leq (L_p/L_n) < 1 \tag{3}$$

where $S_n$ denotes a specific surface area (m$^2$/g) of the negative electrode layer as determined by the BET method, $S_p$ denotes a specific surface area (m$^2$/g) of the positive electrode layer as determined by the BET method, $L_n$ denotes a thickness (μm) of the negative electrode layer, and $L_p$ denotes a thickness (μm) of the positive electrode layer.

22. The battery pack according to claim 21, further comprising a protective circuit which detects a voltage of each of the nonaqueous electrolyte batteries.

23. The battery pack according to claim 21, wherein the specific surface area $S_p$ of the positive electrode layer as determined by the BET method falls within a range of 0.1 to 2 m$^2$/g.

24. A vehicle comprising a battery pack defined in claim 21.

* * * * *